United States Patent [19]

Burnham, Sr. et al.

[11] 3,975,171

[45] Aug. 17, 1976

[54] APPARATUS AND METHOD FOR DEGASSING DRILLING FLUIDS

[76] Inventors: Gerald E. Burnham, Sr., 2000 W. St. Mary Blvd.; Gerald E. Burnham, Jr., 414 Karen Drive, both of Lafayette, La. 70501

[22] Filed: Oct. 14, 1975

[21] Appl. No.: 622,213

[52] U.S. Cl. .................................. 55/36; 55/52; 55/159; 259/DIG. 42
[51] Int. Cl.² ............................................ B01D 19/00
[58] Field of Search .................. 55/15, 36, 52, 159, 55/189, 100, 277; 259/100, 104, DIG. 24, DIG. 42

[56] References Cited
UNITED STATES PATENTS

| | | | |
|---|---|---|---|
| 2,376,221 | 5/1945 | Baker | 55/52 X |
| 2,485,857 | 10/1949 | Bower | 55/52 X |
| 3,284,991 | 11/1966 | Ploeger et al. | 55/52 X |

Primary Examiner—Charles N. Hart
Assistant Examiner—Richard Burks
Attorney, Agent, or Firm—Schuyler, Birch, Swindler, McKie & Beckett

[57] ABSTRACT

Degassing apparatus for removing entrained gas bubbles from drilling fluid comprises a conduit through which drilling fluid may flow and a cavitator located within the conduit. The conduit includes generally opposed first and second surfaces positioned to contact drilling fluid flowing through the conduit. The cavitator has first and second surfaces respectively opposed to the conduit first and second surfaces and is reciprocatable between a first position proximal the conduit first surface and a second position distal the conduit first surface and proximal the conduit second surface. In operation, drilling fluid is conducted through the conduit, and the action of the cavitator alternately compresses and then rarefies the fluid between the cavitator surfaces and the respective opposed conduit surfaces.

15 Claims, 7 Drawing Figures

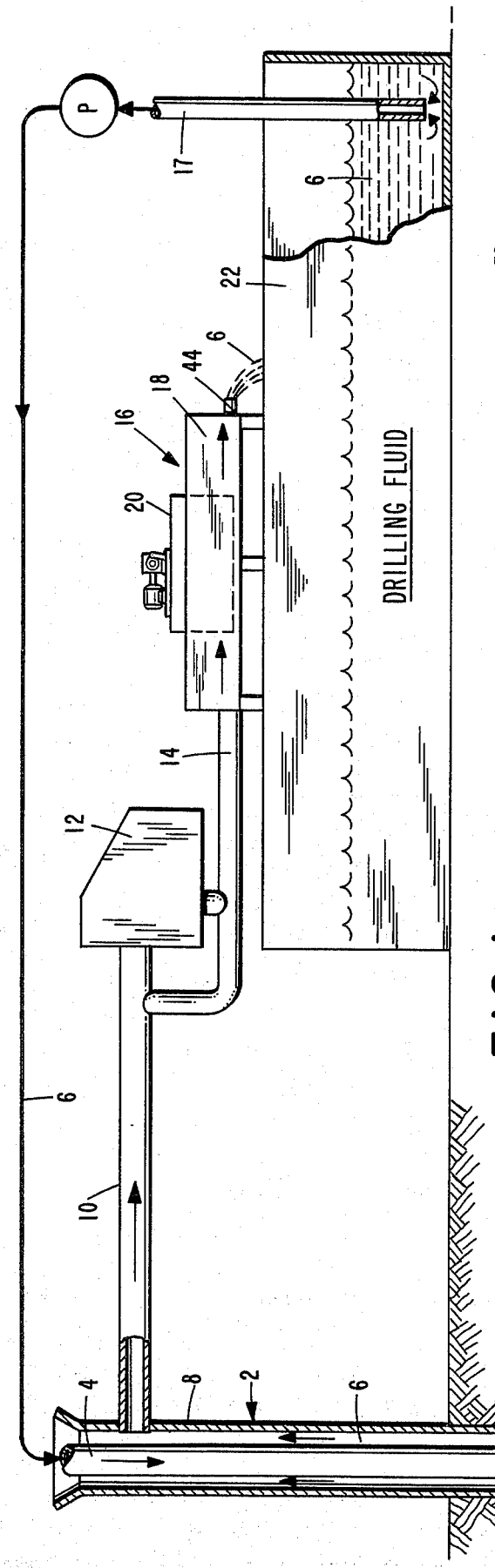
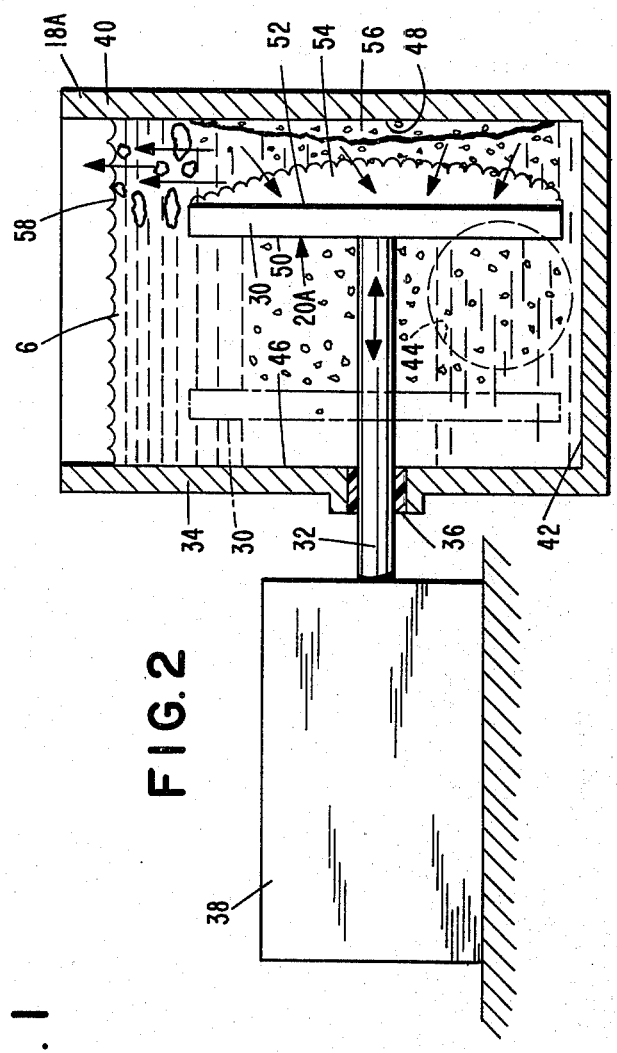
FIG. 1
FIG. 2

APPARATUS AND METHOD FOR DEGASSING DRILLING FLUIDS

BACKGROUND OF THE INVENTION

The present invention relates to a method and apparatus for liberating and removing gas bubbles entrained in drilling fluid, such as drilling mud, utilized in the drilling operation of wells, such as oil wells.

In conventional well drilling operations it is customary to pump substantial quantities of a specially formulated drilling mud down through the drill stem to be discharged through apertures adjacent the drill bit. This drilling mud serves not only to lubricate the drill bit and to remove the displaced rock, sand and other materials from adjacent the bit to a discharge point on the surface of the well site, but also to prevent the escape or blowout of natural gas encountered by the drill. During the flow of the mud from adjacent the drill bit to the surface it frequently becomes contaminated in the well with natural gas or air, this contamination taking the form of entrained minute bubbles of gas in the mud. For economic reasons it is desirable to recycle the special drilling mud through the well instead of continuously supplying new material. However, the presence of the entrained gas bubbles in the drilling mud decreases its density and substantially diminishes its efficiency both in lubricating the drill and in preventing well blowouts. Accordingly, it is desirable to degas the drilling mud to prepare it for recycling through the well.

Because of the physical characteristics of drilling mud, particularly its abrasiveness and its high viscosity which makes liberation of entrained gas bubbles difficult, special degassing systems have been required. Drilling mud degassing apparatus and procedures have generally involved centrifugal pumps or other rotary impellers in order to obtain the necessary agitation of the viscous liquid. Conventional reciprocating cavitators, such as disclosed in Baker, U.S. Pat. No. 2,376,221, for use with liquid food products such as fruit juices, have generally proved unsuitable for the removal of minute entrained gas bubbles from viscous drilling mud. One cause of the inadequacy of such reciprocating agitators in drilling mud applications is the tendency of the highly viscous liquid to flow around the reciprocating agitator without substantial mixing action, such that gas may be removed from the mud immediately adjacent the agitator, while little degassing is effected of the liquid spaced from the agitator, such as that adjacent the conduit walls. Accordingly, such prior art reciprocating cavitators have generally been found unsuited for applications involving such viscous materials.

SUMMARY OF THE INVENTION

This invention describes a system for degassing drilling fluid, such as mud, in a continuous manner as the mud is circulated to and from a well head. The system includes a conduit, at least two generally opposed surfaces of which are in contact with drilling fluid flowing therethrough. Disposed within this conduit is a cavitator reciprocating transversely of the fluid flow in a direction generally toward and away from the aforementioned two conduit surfaces in contact with the fluid. The cavitator, having two surfaces respectively opposed to the aforementioned generally opposed fluid contacting conduit first and second surfaces, reciprocates between a first position proximal the conduit first surface and a second position distal the conduit first surface and proximal the conduit second surface. During operation of this degassing apparatus drilling fluid flowing through the conduit is alternately compressed and then rarefied between the cavitator surfaces and the respective opposed conduit surfaces to promote coalescence of small entrained gas bubbles into larger bubbles which may rise more readily to the uppermost surface of the fluid for removal.

An object of this invention is the provision of a new and simplified system for degassing drilling fluids whereby a large quantity of entrapped gas may be removed efficiently from the fluid as the fluid is recirculated to and from the well head. Other objects and advantages of this application will become apparent from the following description taken in connection with the accompanying drawings wherein several embodiments of the invention are set forth by way of illustration and example.

DESCRIPTION OF THE DRAWINGS

FIG. 1 is a schematic side elevation, partially in section, of a drilling fluid recirculating system incorporating the degassing method and apparatus of this invention;

FIG. 2 is a side elevation, partially in section, of one embodiment of the degassing apparatus of this invention;

DETAILED DESCRIPTION OF PREFERRED EMBODIMENTS OF THE INVENTION

Figure 3:
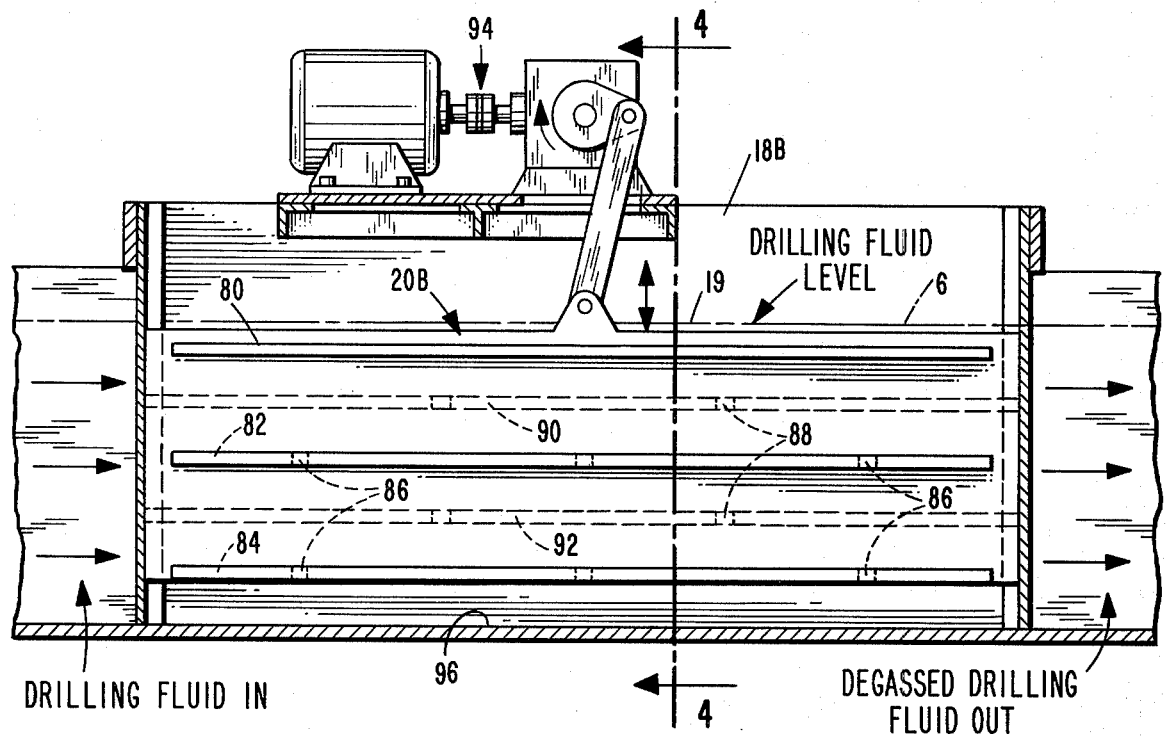
FIG. 3 is a side elevation, partially in section, of a second embodiment of the degassing apparatus of this invention.

FIG. 1 is a schematic representation of a system for degassing and recirculating a drilling fluid, such as mud, through a well. In this illustration reference numeral 2 generally refers to the well head, including a hollow drill stem 4 through which drilling fluid 6 is pumped to the drill bit (not shown). The drilling fluid 6 then returns to the surface through the annular passage formed by the well head casing 8 about the drill stem 4 and is conducted through pipe 10 to the shaker 12 for initial removal of undesirable impurities. From the shaker 12 the fluid is conducted through pipe 14 to a degassing apparatus generally indicated by numeral 16. This degassing apparatus broadly comprises a conduit 18, through which the drilling fluid 6 flows, and cavitator 20, which reciprocates transversely of the direction of fluid flow. From this degassing apparatus 16 the drilling fluid 6, now substantially free of entrained gas, is conducted to a storage tank 22 for holding until it is recirculated through pipe 17 to the drill stem at the well head.

In FIG. 2 one simple embodiment of the degassing apparatus of this invention is illustrated as a sectional view taken transversely of the conduit 18A and its fluid flow. In this embodiment conduit 18A corresponds to conduit 18 of FIG. 1, with the drilling fluid 6 flowing therethrough and the reciprocating cavitator indicated generally by reference numeral 20A. The cavitator 20A comprises a generally flat plate 30, of which one edge is shown and which conveniently may be rectangular or square. This plate 30 is affixed to horizontally reciprocating actuating rod or member 32, which passes through sidewall 34 of the conduit 18A and is provided with a fluid-tight seal 36, generally as shown. Horizontal reciprocation of the cavitator 20A may be provided by a hydraulic motor, an eccentric, an electric solenoid, a cam, or any other suitable conventional device for imparting reciprocation to a member such as actuating member 32.

In this embodiment conduit 18A may suitably comprise an extended trough of rectangular cross-section having sidewalls 34 and 40, bottom 42 and outlet pipe 44, the inlet pipe 14 not being shown in this sectional view. The inwardly facing surfaces 46 and 48 of the respective conduit sidewalls 34 and 40 are generally opposed to one another and are positioned to be in contact with the drilling fluid, or mud, flowing through the conduit 18A. As seen in FIG. 2, the broad surfaces 50 and 52 of the cavitator plate 30 are respectively opposed to the conduit surfaces 46 and 48. In this embodiment the cavitator plate 30 reciprocates between a first position proximal conduit surface 48, as shown in the solid line representation of FIG. 2, and a second position proximal conduit surface 46, as shown in the broken line representation of FIG. 2.

In FIG. 2 the cavitator plate 30 is illustrated as moving to the left, away from conduit surface 48, thus creating a vacuum cavity 54 adjacent the surface 52 of the cavitator plate 30. By virtue of the high viscosity of drilling fluids such as drilling mud and the close approach of cavitator plate 30 to conduit surface 48, the movement of the cavitator plate 30 away from such surface 48 tends also to draw the drilling fluid 6 which is trapped between the plate and the surface 48 along with the retreating cavitator plate 30. This tendency causes the drilling fluid 6 adjacent the wall 48 to be drawn away from the wall, thus creating an additional vacuum cavity 56 adjacent the wall.

By the creation of these respective vacuum cavities 54 and 56, the gas entrained in the drilling fluid in the form of minute bubbles is drawn into these low pressure or vacuum cavities 56 and 54, thus rupturing the minute bubbles entrained in the fluid as it comes from the well head. Accordingly, these small entrained bubbles are caused to coalesce into a smaller number of substantially larger gas bubbles within the vacuum cavities 54 and 56. These larger gas bubbles, unlike the small entrained gas bubbles, have sufficient buoyancy to rise to the uppermost surface 58 of the viscous drilling fluid 6 flowing within the conduit 18A and thus escape into the atmosphere. As the cavitator plate 30 continues its movement away from conduit surface 48, the larger coalesced bubbles formed in vacuum cavity 56 also are carried away by the fluid flow, thus freeing additional buoyant bubbles of gas for escape to the drilling fluid surface 58.

As indicated in FIG. 2, the cavitator plate 30 continues its advance toward the opposite conduit sidewall 46 until it reaches a point generally indicated by the broken line representation of FIG. 2. At that point the cavitator reverses its direction of reciprocation and begins its movement away from conduit surface 46 and toward conduit surface 48. Obviously, during this movement oof the cavitator plate 30 away from the surface 46, vacuum cavities would be formed adjacent conduit surface 46 and cavitator plate surface 50, which cavities would correspond to those vacuum cavities 56 and 54 illustrated. Thus, the reciprocation of the cavitator, with its alternating approach and retreat from positions proximal the opposing sidewalls of the cavity, serves alternately to compress and then to rarefy the drilling fluid which is between the cavitator plate and the respective sidewalls, thus effectively promoting the coalescence of small entrained gas bubbles into bubbles sufficiently large and buoyant to escape from the mud, effecting the degassing function.

Figure 4:
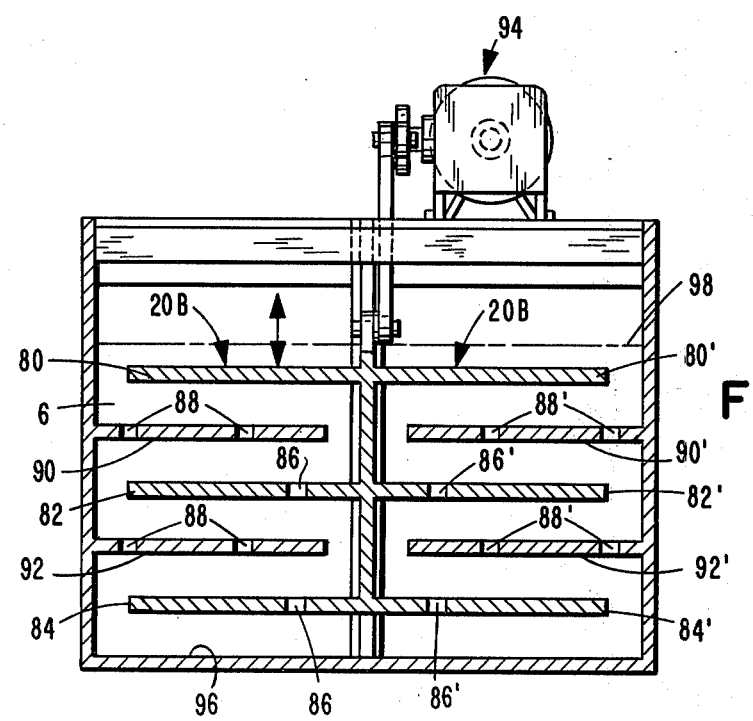
FIG. 4 is an end elevation, partially in section, of the degassing apparatus of FIG. 3.

FIGS. 3 and 4 illustrate another embodiment of the degassing apparatus of this invention. In this embodiment, instead of the single cavitator member or plate of the previous embodiment, the cavitator 20B comprises a plurality of interconnected, generally parallel, spaced members 80–80', 82–82' and 84–84' extending horizontally in the conduit 18B, generally transversely of both the vertical direction of reciprocation and the direction of fluid flow within the conduit. Between each adjacent pair of cavitator members is interposed a baffle parallel thereto and extending inwardly of the conduit sidewalls and partway across the conduit 18B. In this embodiment baffles 90 and 90', extending longitudinally of conduit 18B, are interposed between adjacent cavitator member pairs 80–80' and 82–82', with baffles 92 and 92' interposed between cavitator member pairs 82–82' and 84–84'. These cavitator members and baffles may be solid, plate-like members as shown or may have perforations 86, 86', 88 and 88' to assist escape of gas bubbles to the uppermost surface of the drilling fluid.

Reciprocation of the cavitator 20B, such as by the motor and eccentric arrangement 94, serves alternately to compress and then to rarefy the drilling fluid 6 flowing between the cavitator members and the horizontally extending conduit surfaces. Specifically, the drilling fluid is alternatively compressed and rarefied between the lower surface of cavitator members 84–84' and the bottom surface 96 of the conduit and also between the upper surface of member 84–84' and the lower surface of the baffles 92 and 92'. Similarly, the drilling fluid is alternatively compressed and rarefied between the lower surface of the cavitator members 82–82' and the upper surface of baffles 92 and 92', as well as between the upper surface of cavitator members 82–82' and the lower surface of baffles 90 and 90'. It may be noted that the drilling fluid also is alternatively compressed and rarefied between the lower surface of cavitator members 80–80' and the upper surface of baffles 90–90', although there is no upper baffle for cooperation with the upwardly facing surface of cavitator members 80–80'. Obviously, any convenient number of cavitator member-baffle pairs conveniently could be provided in such an embodiment with corresponding results.

The principal advantage of multiple cavitator-baffle arrangement of FIGS. 3 and 4 is the presentation of additional cavitating surfaces to the drilling fluid, with correspondingly greater cavitation and degassing effectiveness of the structure. In apparatus of this configuration the rising buoyant gas bubbles from the lower portions of the conduit 18B reach the uppermost surface 98 of the drilling fluid either by following the sinuous path to that surface around the ends of the cavitator members and the baffles or by escaping upwardly through cavitator and baffle perforations 86, 86', 88 and 88'.

Figure 5:
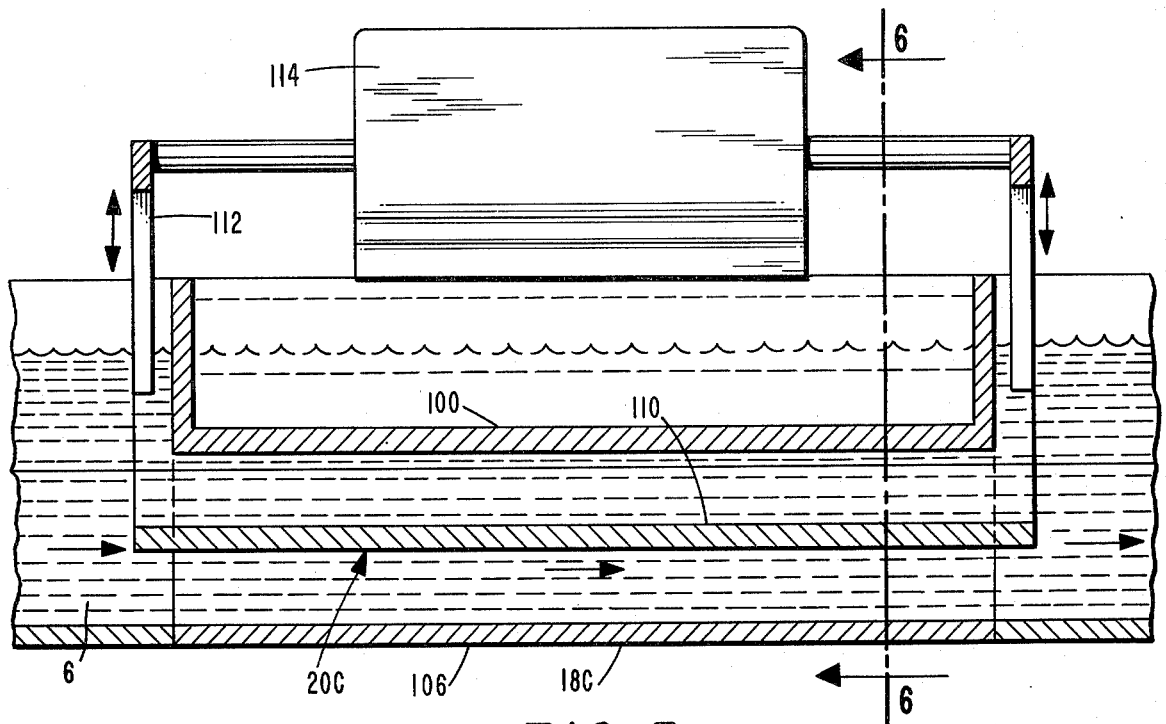
FIG. 5 is a side elevation, partially in section, of a third embodiment of the degassing apparatus of this invention.
Figure 6:
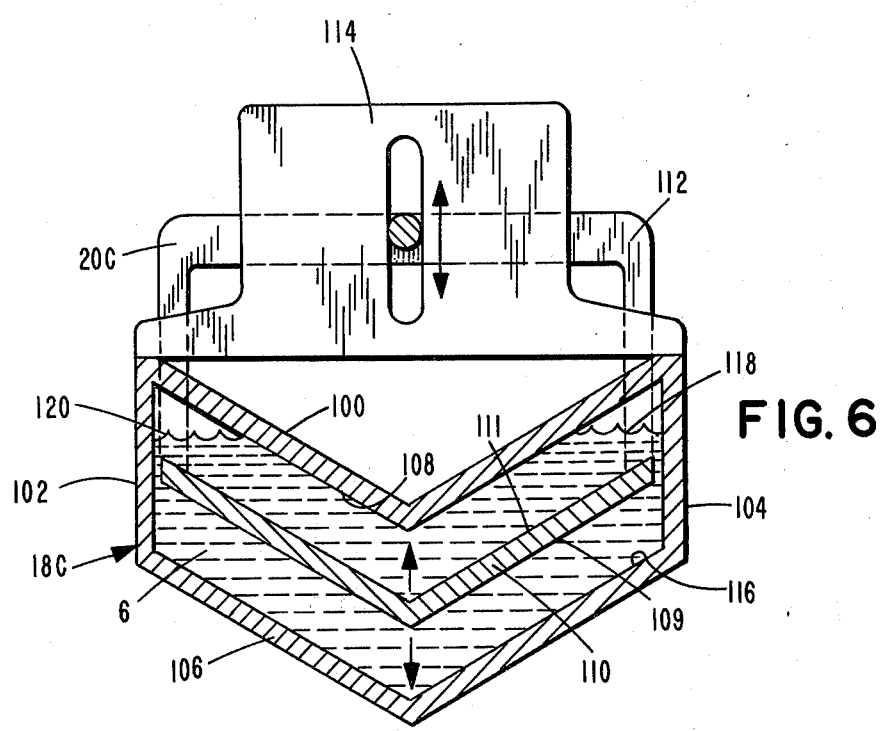
FIG. 6 is an end elevation, partially in section, of the degassing apparatus of FIG. 5.

In FIGS. 5 and 6 is illustrated a third embodiment of the degassing apparatus of this invention. In this third embodiment the principles of operation are substantially the same as with the preceding embodiments, with the reciprocating cavitator 20C working alternatively against two mutually opposed fluid contacting surfaces of the conduit 18C.

In this third embodiment of the invention the conduit has a generally V-shaped cross section, taken transversely of the fluid flow indicated by the arrows in FIG. 5. More particularly, a conduit top panel 100 having a V-shaped cross-section, formed by the intersection of two angled planar conduit portions, is joined along its outside edges by generally vertical sidewalls 102 and 104 to the outside edges of a conduit bottom panel 106, also having a corresponding V-shaped cross-section, as shown in FIG. 6. The apparatus of this embodiment is structured such that the fluid level in the conduit in this embodiment is maintained in contact with a substantial portion of the lower surface 108 of upper member 100, also as shown in FIG. 6. The cavitator 20C comprises cavitator member 110 interposed between conduit upper and lower panels 100 and 106, generally parallel thereto and having a V-shaped cross-section generally corresponding to the configuration of such upper and lower conduit panels. The cavitator member 110 is connected by linkage 112 to a suitable drive mechanism 114 for imparting generally vertical reciprocation to the cavitator.

The method of operation of the degassing apparatus of FIGS. 5 and 6 is substantially similar to that operation described with respect to the embodiment of FIG. 2. The cavitator member 110 reciprocates generally vertically between a first position with cavitator lower surface 109 proximal the upwardly facing surface 116 of conduit bottom member 106 and a second position distal bottom member 106, and with cavitator upper surface 111 proximal the lower surface 108 of conduit upper panel member 100. In the manner similar to that of the embodiment of FIG. 2 the drilling fluid 6 flowing through the conduit 18 is alternatively compressed and then rarefied between the surfaces of the cavitator member 110 and the mutually opposed surfaces of conduit members 100 and 106. In this embodiment the released buoyant gas bubbles may rise to the uppermost surfaces 118 and 120 of the drilling fluid 6, for release into the atmosphere.

Figure 7:
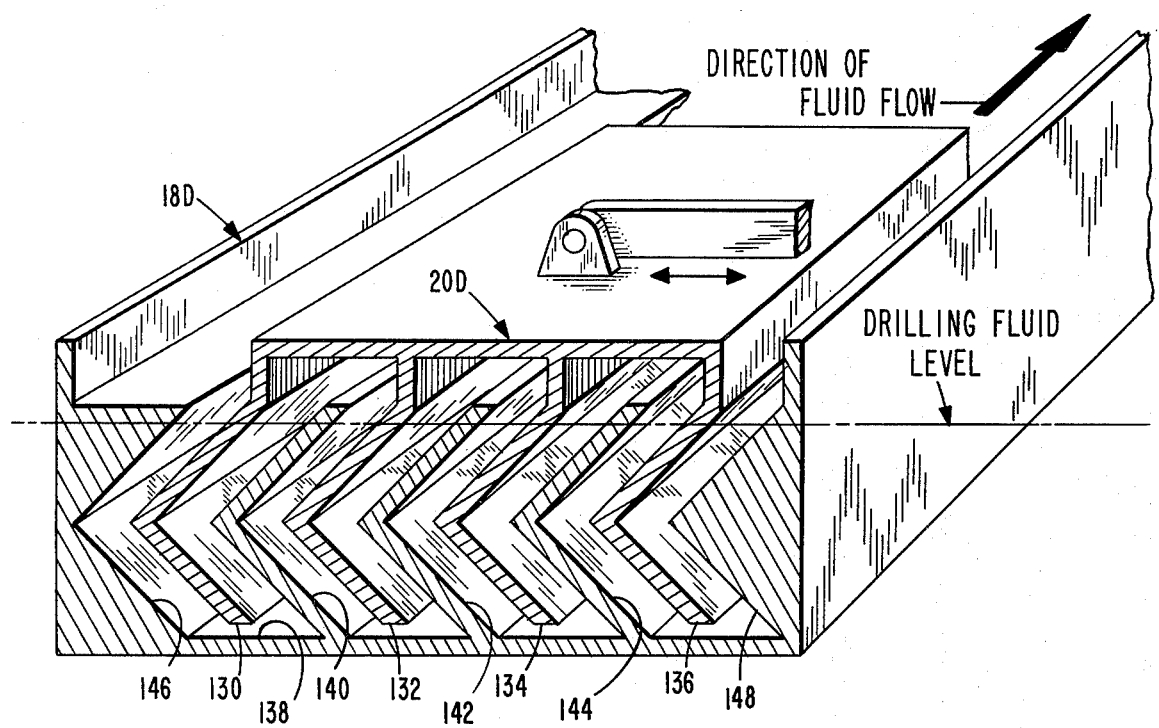
FIG. 7 is an end perspective view, partially in section, of a fourth embodiment of the degassing apparatus of this invention.

In FIG. 7 is illustrated a conduit and cavitator structure of a fourth embodiment of the degassing apparatus of this invention, the conventional reciprocating drive means being omitted for clarity.

In this fourth embodiment of the invention it can be seen that the cavitator 20D comprises a plurality of generally parallel interconnected cavitator members 130, 132, 134 and 136 in contact with the drilling fluid flowing through the conduit 18D. Each of these cavitator members 130, 132, 134 and 136 is of a V-shaped cross-section, taken transversely of the direction of fluid flow. This V-shaped cross-section, with all apexes extending in the same direction, results from the cavitator members 130, 132, 134 and 136 each being formed by the intersection of two angled planar member portions, as shown in FIG. 7. The conduit 18D, within which cavitator 20D reciprocates generally horizontally, has a generally flat liquid contacting bottom surface 138 with baffles 140, 142 and 144 extending upwardly therefrom and longitudinally of conduit 18D. One such baffle is interposed between each of the respective adjacent cavitator member pairs 130–132, 132–134, and 134–136, and each such baffle is of a V-shaped configuration matingly corresponding to the configuration of its adjacent cavitator member pair. Additionally, the liquid contacting sidewall portions 146 and 148 of the conduit 18D are of a V-shaped configuration matingly corresponding to the configuration of the cavitator members, with the surfaces thereof being formed by the intersection of two angled planar portions, also as shown in FIG. 7.

As indicated by the arrow in FIG. 7, the cavitator 20D is reciprocated generally horizontally, transversely of the fluid flow through the conduit 18D. This reciprocation of the cavitator 20D serves alternately to compress and then to rarefy the drilling fluid between the surfaces of the cavitator and the mutually opposed, generally parallel V-shaped surfaces of the baffles and conduit sidewalls in a manner similar to that described in greater detail with respect to FIG. 2.

It is to be understood that, while the invention is herein illustrated and described in various preferred forms, numerous other modifications and variations, all within the scope of this invention, will readily occur to those skilled in this art. Obviously, the configuration of the cavitators and the conduits may readily be altered and the number of cavitator members and interposed baffles, if any, may be changed without departure from the scope and spirit of this invention. Similarly, the relative movement between cavitator members and adjacent baffles could be achieved within the scope of the invention by reciprocation of the baffles, or of the baffles and the conduit, or by joint movement of both the cavitator members and the baffles. Accordingly, the scope of this invention is not to be limited by the embodiments disclosed but is to be determined solely by the claims appended hereto.

We claim:

1. Degassing apparatus for removing entrained gas bubbles from drilling fluid, comprising:
   a conduit through which drilling fluid may flow, said conduit having a first surface and a second surface generally opposed to said first surface, both said surfaces being positioned to contact drilling fluid flowing through said conduit; and
   a cavitator within said conduit, said cavitator having first and second surfaces respectively opposed to said conduit first and second surfaces, said cavitator being reciprocatable by drive means between a first position proximal said conduit first surface and a second position distal said conduit first surface and proximal said conduit second surface, whereby, during operation of said degassing apparatus, drilling fluid flowing through the conduit is alternately compressed and rarefied between the cavitator surfaces and the respective opposed conduit surfaces to promote coalescence of small entrained gas bubbles into larger bubbles which may rise more readily to the uppermost surface of the fluid for removal.

2. Drilling fluid degassing apparatus according to claim 1 wherein said conduit first and second surfaces are of nonplanar configurations.

3. Drilling fluid degassing apparatus according to claim 2 wherein said cavitator first and second surfaces are of configurations generally matingly corresponding to said respectively opposed conduit surfaces.

4. Drilling fluid degassing apparatus according to claim 3 wherein said conduit first and second surfaces are each formed by the intersection of two angled planar surface portions, whereby said conduit first and second surfaces are each generally of a V-shaped configuration.

5. Drilling fluid degassing apparatus according to claim 1 wherein said conduit first and second surfaces comprise upper and lower interior surfaces of said conduit.

6. Drilling fluid degassing apparatus according to claim 1 wherein said conduit first and second surfaces comprise opposed interior side surfaces of said conduit.

7. Drilling fluid degasssing apparatus according to claim 1 wherein said cavitator comprises a member having apertures therethrough.

8. Drilling fluid degassing apparatus according to claim 1 wherein at least one of said conduit surfaces comprises a surface of baffle means affixed to and extending longitudinally of said conduit.

9. Drilling fluid degassing apparatus according to claim 8 wherein said cavitator comprises a plurality of members extending generally transversely of the direction of reciprocation, with said baffle means extending generally parallel to said members with one baffle interposed between each adjacent pair of said members.

10. Drilling fluid degassing apparatus according to claim 8 wherein said baffle means comprises a baffle having apertures therethrough.

11. Drilling fluid degassing apparatus according to claim 8 wherein said baffle means comprises at least one baffle extending inwardly from at least one sidewall of said conduit.

12. Drilling fluid degassing apparatus according to claim 11 wherein said baffle means comprises a plurality of said baffles.

13. Drilling fluid degassing apparatus according to claim 8 wherein said baffle means comprises at least one baffle extending inwardly from the bottom wall of said conduit.

14. Drilling fluid degassing apparatus according to claim 13 wherein said baffle means comprises a plurality of said baffles.

15. A method of removing entrained gas bubbles from drilling fluid, comprising:

flowing said drilling fluid through a conduit having a reciprocating cavitator disposed within, said conduit having generally opposed first and second surfaces in contact with said drilling fluid, and said cavitator having a member extending generally parallel to said conduit opposed surfaces; and reciprocating said cavitator between a first position wherein said cavitator member is proximal said conduit first surface and a second position wherein said cavitator member is distal said conduit first surface and proximal said conduit second surface such that said drilling fluid is alternately compressed and rarefied between said cavitator member and each said conduit opposed surface, whereby is promoted coalescence of small entrained gas bubbles into larger bubbles which may rise more readily to the uppermost surface of the drilling fluid for removal.

* * * * *